United States Patent [19]

Von Meyerinck et al.

[11] Patent Number: 4,653,554
[45] Date of Patent: Mar. 31, 1987

[54] HEAD PIECE FOR FUELING SYSTEMS

[76] Inventors: Wolfgang Von Meyerinck, Espenstrasse 5, D-6306 Langgoens; Dietz Von Meyerinck, Arnsburger Strasse 14, D-6302 Lich 2, both of Fed. Rep. of Germany

[21] Appl. No.: 873,072

[22] Filed: Jun. 2, 1986

Related U.S. Application Data

[63] Continuation of Ser. No. 684,562, Dec. 21, 1984.

[30] Foreign Application Priority Data

Jul. 4, 1984 [EP] European Pat. Off. ........ 84107767.0

[51] Int. Cl.$^4$ .............................................. B67D 5/70
[52] U.S. Cl. .................................... 141/387; 137/615; 285/162; 285/168
[58] Field of Search ...................... 141/1–12, 141/279, 387, 388, 389; 285/162, 168; 137/615

[56] References Cited

U.S. PATENT DOCUMENTS

| | | | |
|---|---|---|---|
| 1,885,886 | 11/1932 | Banks | 285/168 |
| 2,803,269 | 8/1957 | Switzer | 141/250 |
| 2,953,161 | 9/1960 | Muller | 137/615 |
| 3,724,499 | 4/1973 | Huniu | 137/615 |
| 3,891,004 | 6/1975 | Knight | 137/615 |
| 4,121,616 | 10/1978 | Lochte | 137/615 |

FOREIGN PATENT DOCUMENTS

| | | |
|---|---|---|
| 2452177 | 5/1976 | Fed. Rep. of Germany. |
| 2072405 | 9/1971 | France. |
| 2234221 | 1/1975 | France. |
| 1587114 | 4/1981 | United Kingdom. |

*Primary Examiner*—Houston S. Bell, Jr.
*Attorney, Agent, or Firm*—Flynn, Thiel, Boutell & Tanis

[57] ABSTRACT

A head piece for movable or stationary fueling systems, in particular for aircraft fueling, includes a filler-neck coupling for connecting it to a tank which is to be filled or emptied, is easily handleable, is exposed to little wear, and permits quick refueling and defueling without any need for hoses. It includes a line having five pipe sections which are movably connected with one another by swivel joints which have a degree of freedom. At the end of the line remote from the filler-neck coupling, there is a further swivel joint for connecting the head piece to the fueling system. Of the five swivel joints, three are arranged with axes of rotation which are parallel to one another, and the axes of rotation of the remaining two joints are perpendicular to the axes of rotation of the other three joints.

11 Claims, 5 Drawing Figures

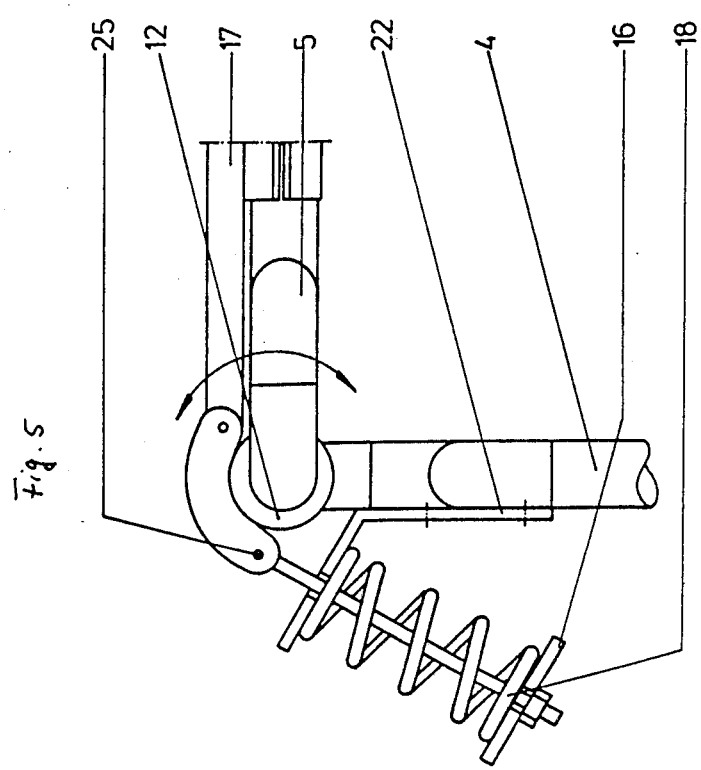
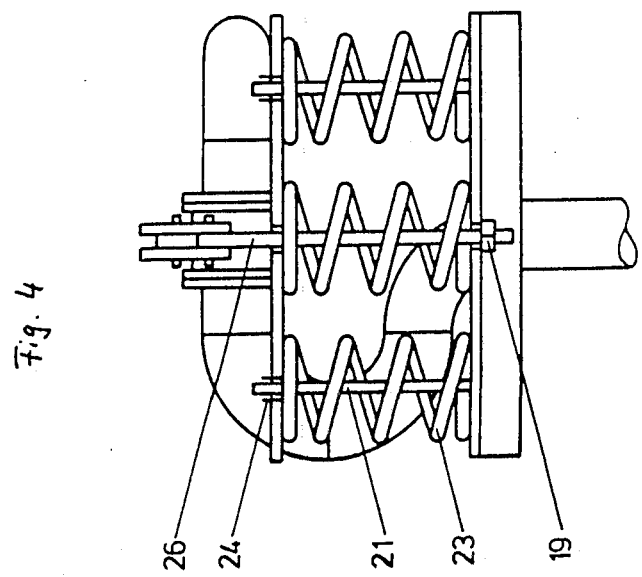

HEAD PIECE FOR FUELING SYSTEMS

This application is a continuation of U.S. Ser. No. 684,562, filed Dec. 21, 1984.

FIELD OF THE INVENTION

This invention relates to a head piece for movable or stationary fueling systems, and in particular, to a head piece for aircraft fueling having a filler-neck coupling connecting it to the tank which is to be filled or emptied.

BACKGROUND OF THE INVENTION

During the fueling of vehicles, in particular aircraft utilized in military applications, large amounts of fuel must be moved within the shortest possible time period from a hydrant system or a tank car into the vehicle tank which is to be filled. A problem during this fueling operation involves the last twenty to thirty meters from the tank car or the hydrant system to the tank which is to be filled. It is known to use hoses here which are provided at one end with the filler-neck coupling, so that the fueling operation can occur directly after connection to the fill opening. Here, hoses with a steel or Perlon insert are used which, as a rule, have nominal diameters of $2\frac{1}{2}$ to a maximum of 3". In particular, in the case of lengths of over 20 meters, only hoses with small diameters are used, due to the high weight, since they otherwise can hardly be handled when the hose must be pulled or carried. A transport of the hoses in an unrolled condition, for example to several connections in the cases of a hydrant system, is hardly possible because of high friction with the ground. In every case, the durability of the hose is substantially reduced through this. With respect to the durability of the material, on the one hand an aging of the material occurs here and, on the other hand, damage due to cutting of the steel insert occurs, for example when a tank car drives over the hoses. This damage, in particular if we are dealing with inner damage, can be recognized only with great difficulty, so that a hose must be exchanged periodically for safety reasons after a certain duration of use which involves considerable expense.

A further decisive disadvantage when using a hose is that it can be utilized for defueling only in a limited manner and only in a special design which increases costs. Furthermore, the hose can be emptied only by lifting it, which also brings about a considerable disadvantage. However, it has proved disadvantageous that the coupling of the hose to the aircraft coupling is difficult due to the heavy weight and the tension of the hose and that, due to the hose and its weight, a high stress on the aircraft coupling takes place and can result in damage. Furthermore, pressure relief in hoses is very difficult to realize. Pressure relief is necessary, since the high expansion coefficient of aircraft gasoline causes a great volume increase during a temperature increase. The thus caused pressure increase stretches the hoses, so that they can no longer be bent. In the reverse case, namely for falling temperatures, an underpressure is created in the hose, so that it collapses and the reinforcement of the hose breaks.

The above disadvantages resulting from the use of hoses for fueling shows that, aside from handling difficulties and high wear, which are to be expected, the fueling time can hardly be reduced by increasing the nominal diameter of the hose, because of the increased disadvantage in handling which is created by the enlargement of the nominal diameter. Hoses represent, because of these susceptibilities and the heat sensitivity, a high safety risk, in particular when used near hot turbines and motors or when used near running turbines, as is the case during rapid fueling of military aircraft. The described disadvantages require, at the same time, an intensive servicing and testing operation for the hose which must take place before and after each fueling operation.

A basic purpose of the invention is to provide a head piece for fueling systems of the above-mentioned type which can be connected directly to tank cars, fueling arms or a hydrant system, which can be designed easily and without any handling difficulties with a diameter of 4" or more, which is subject to minimal wear, which can be operated in a simple manner and can be connected almost moment-free to the aircraft coupling or some other coupling, which requires little service, which is suited for both the fueling and defueling, which can be stored in a small space, and which can be used near running turbines and motors without any safety risk.

SUMMARY OF THE INVENTION

This purpose is attained by providing a head piece of the foregoing type which includes a line formed of five pipe sections which are connected with one another by swivel joints with only one degree of freedom, wherein at the end of the line remote from the filler-neck coupling there is provided a further swivel joint for connecting the head piece to a fueling system, and wherein three of the five swivel joints have axes of rotation which are parallel to one another and the other two swivel joints have axes of rotation which are perpendicular to the axes of rotation of the other three joints.

Thus, the head piece for the inventive fueling system includes five pipe sections connected by four swivel joints which each have only one degree of freedom, so that the coupling which is provided at one end of the head piece can assume any desired orientation. For this purpose, these four swivel joints and the further swivel joint are arranged so that three axes of rotation which are perpendicular to the axes of the other two. This arrangement of the five swivel joints makes it possible to swivel the tank coupling to all possible orientations, so that the coupling surfaces can always be aligned parallel to an aircraft filler-neck coupling and so that a connection to the latter is possible without any moment of force. In order to make handling of the head piece simpler, the first pipe section, which can be connected to the fueling system by the further swivel joint and is preferably arranged so that its axis of rotation is vertical, is connected to the second pipe section by a balance mechanism which has an adjustable spring package which supports the weight of the pipe sections connected to the first pipe section, as well as the associated swivel joints, so that the tank coupling can be moved to and held in any orientation without significant force. Through this, it is assured that, even in the case of a large nominal diameter and a line which is under pressure, an effortless handling and connecting of the head piece is possible.

BRIEF DESCRIPTION OF THE DRAWINGS

One exemplary embodiment of the invention is described hereinafter in greater detail in connection with the drawings, in which:

FIG. 4 is a fragmentary end view of the headpiece of FIG. 1; and

FIG. 5 is a fragmentary side view of the headpiece of FIG. 1.

DETAILED DESCRIPTION

Figure 1:
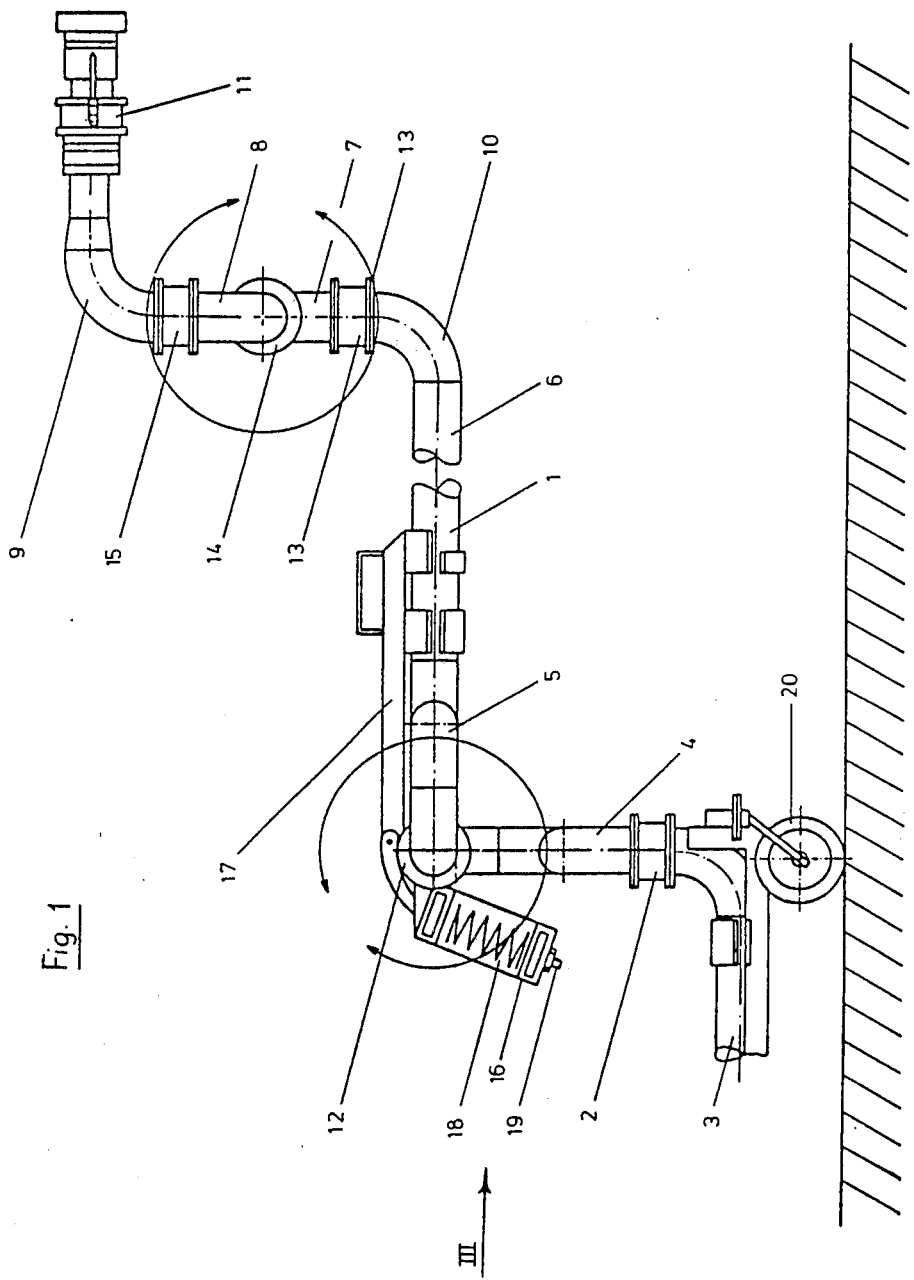
FIG. 1 is a side view of an inventively constructed head piece for a fueling system.
Figure 2:
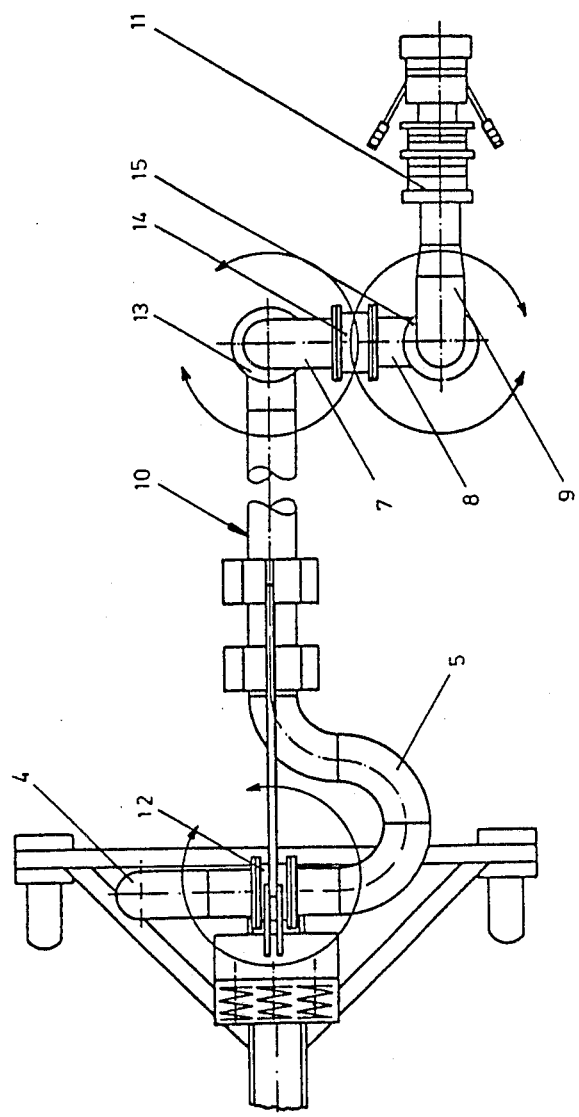
FIG. 2 is a top view of the exemplary embodiment illustrated in FIG. 1.
Figure 3:
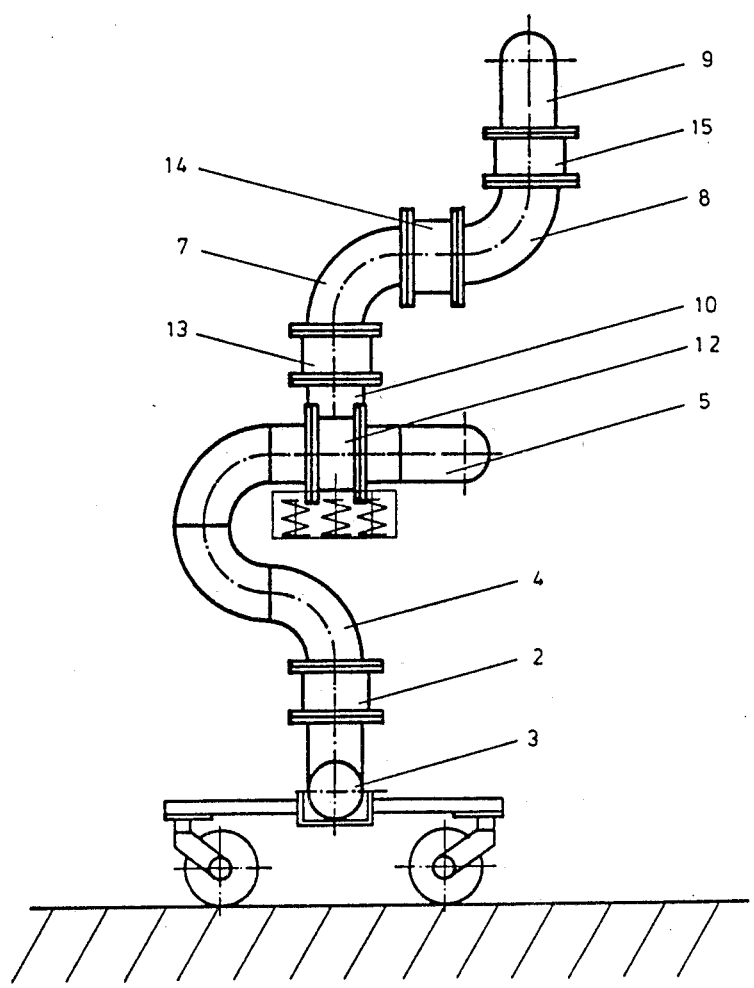
FIG. 3 is a view of the exemplary embodiment illustrated in FIG. 1 which is taken in the direction III in FIG. 1.

The head piece 1 which is illustrated in FIGS. 1 to 3 can be connected through a first swivel joint 2 to a fueling system 3 and has a line 10 which includes five pipe sections 4, 5 and 7–9, one end of the line 10 being provided with a filler-neck coupling 11. The first pipe section 4 has at its ends respective swivel joints 2 and 12. The first swivel joint 2 has a vertical axis of rotation, while the second swivel joint 12 has a horizontal axis of rotation. As can be seen from FIG. 3, the second swivel joint 12 lies above the first swivel joint 2. The pipe section 4 which connects the two swivel joints 2 and 12 is, as can be seen from FIG. 3, curved.

A third swivel joint 13 is connected to the second swivel joint 12 by the pipe section 5, which is first curved and then extends rectilinearly. This shape of the pipe section 5 was chosen so that, viewed in the top view, the swivel joints 2, 12 and 13 lie in one plane. The pipe section 7 is arcuate, is connected to the swivel joint 13, and is secured to a swivel joint 14, the axis of rotation of which extends perpendicular to the axis of rotation of the swivel joint 13. To this swivel joint 14 is connected the pipe section 8, which is arcuate and connected to a swivel joint 15 having an axis of rotation which lies in a plane which is parallel to the axis of rotation of the swivel joint 13. The end pipe section 9 is arcuate and connected to the swivel joint 15, and carries the filler-neck coupling 11. The filler-neck coupling is a conventional component, preferably a so-called filler dry coupling which permits the connection of the line 10 which is under pressure to a correspondingly constructed fueling adapter.

A balance unit 16 is secured to the two pipe sections 4 and 5 and includes a diagonal tie 17 and a spring package 18. The initial tension of the spring package 18 can be adjusted by an adjusting mechanism 19, so that the weight of the pipe sections 5 and 7–9, of the filler-neck coupling 41 and of the swivel joints 13–15 is supported. Through this weight balance, it is possible for a single person, without any effort, to connect the filler-neck coupling to a tank adapter.

As shown in FIGS. 4 and 5, the vertically extending pipe section 4 has a fastening angle 22 fixedly connected thereto. The entire balance unit 16 is supported by the fastening angle 22. The spring package 18 acts against the fastening angle 22 and, through a draw rod 26 and the swivel joint 12, pulls on the diagonal tie 17. thus, the pipe section 5 connected to the diagonal tie 17 is urged upwardly. Two guide bolts 21 are guided in respective guideways 24 in the fastening angle 22 and assure proper directional guiding of springs 23 of the spring package 18.

Diagonal tie 17 and draw rod 26 are connected by a bearing bolt 25. The adjusting of the tension of the spring package 18 is carried out using the adjusting mechanism 19, which includes a nut engaging a thread on the draw rod 26.

The head piece 1 can be connected by its first swivel joint 2 to the fueling system 3, which can for example be constructed movably, as is indicated in connection with the wheel 20 thereon. The advantages of the inventively constructed head piece for a fueling system include same being able to be constructed of high-grade steel which, on one hand means a high independent stability and, on the other hand, makes it resistant to external and internal influences. Since the system is built of pipe sections, it can be utilized equally well for both refueling and defueling. Through the five swivel joints, the connecting surface of the filler valve can be aligned in any desired orientation in the available head piece with pipe sections which are adjusted in size to the requisite filling performance, so that the filing time can be reduced to a fraction of the time which was necessary up to now with conventional fueling systems. In particular, in the case of the use of the balance unit, an effortless one-person operation is assured. A further advantage of the inventively constructed head piece is that it can be collapsed within a narrow space, so that it can be stored space-savingly. Further, the fueling safety is substantially increased.

Although a particular preferred embodiment of the invention has been disclosed in detail for illustrative purposes, it will be recognized that variations or modifications of the disclosed apparatus, including the rearrangement of parts, lie within the scope of the present invention.

The embodiments of the invention in which an exclusive property or privilege is claimed are defined as follows:

1. In a head piece for a fueling system which includes a line having at one end thereof a filler-neck coupling which can sealingly connect said line to a fitting having any spatial orientation, said line having at the other end thereof a first swivel joint which has one degree of freedom and can pivotally couple said line to the fueling system, said line including five pipe sections which are serially connected with one another by second, third, fourth and fifth swivel joints which each have only one degree of freedom, said line being movable to a position in which three of said swivel joints have axes of rotation which are parallel to one another and perpendicular to the axes of rotation of the other two of said swivel joints, the improvement comprising wherein the axes of rotation of successive said swivel joints along a path of fluid flow are perpendicular to one another, wherein a first of said pipe sections which is connected to said first swivel joint is connected to a second of said pipe sections by said second swivel joint, and wherein said first and second pipe sections are coupled to balance means for permitting swivelling of said second pipe section relative to said first pipe section and for supporting the weight of said second pipe section as well as the weight of third, fourth and fifth of said five pipe sections in any orientation to which said third, fourth and fifth pipe sections are moved.

2. The head piece according to claim 1, wherein said first swivel joint has a vertical axis of rotation.

3. The head piece according to claim 1, wherein said balance means includes a diagonal tie and a spring package which are respectively connected to said second and first pipe sections, said diagonal tie being resiliently biased by said spring package.

4. The head piece according to claim 3, wherein said balance means includes means for adjusting the initial tension of said spring package.

5. The head piece according to claim 1, wherein said first swivel joint is disposed below said second swivel joint.

6. The head piece according to claim 5, wherein the axis of rotation of a third of said swivel joints, which follows said second swivel joint along a path of fluid flow through said line, lies in a common plane with the axis of rotation of said first swivel joint, and wherein a plane containing the axis of rotation of said third swivel joint extends through said second swivel joint.

7. The head piece according to claim 3, wherein said spring package includes a fastening member which is fixedly secured to said first pipe section and has a flange projecting outwardly from said first pipe section in the region of said second swivel joint, a plate which is parallel to and spaced from said flange and which is located on a side of said flange remote from said second swivel joint, a draw rod which extends through aligned openings in said flange and plate and has threads in the region of said plate, a nut threadedly engaging said threads on said draw rod and disposed on a side of said plate remote from said flange, and a helical spring which is located between and has its ends disposed against said flange and said plate and which encircles said draw rod, an end of said draw rod in the region of said second swivel joint being coupled to said diagonal tie.

8. The head piece according to claim 7, wherein said spring package further includes two guide bolts fixedly secured on said plate on opposite sides of said draw rod and each having a portion remote from said plate which is slidably received in a respective guideway opening provided in said flange, and includes two further helical compression springs which each encircle a respective said guide bolt and which each have ends respectively disposed against said flange and said plate.

9. The head piece according to claim 8, wherein a portion of said diagonal tie at an end thereof adjacent said spring package is slidably supported on an upper surface on said second swivel joint.

10. The head piece according to claim 9, wherein said first swivel joint has a vertical axis of rotation, wherein said second swivel joint is disposed directly above said first swivel joint and has a horizontal axis of rotation, and wherein said third swivel joint has an axis of rotation which, in each operational position of said head piece, is disposed in a vertical plane containing the axis of rotation of said first swivel joint.

11. The head piece according to claim 10, wherein from said second swivel joint said second pipe section extends through a 180° arc, then extends radially outwardly with respect to said second swivel joint, and then extends through a 90° arc to said third swivel joint, said diagonal tie being coupled to said radially extending portion of said second pipe section, wherein said third and fourth pipe sections are each substantially a 90° arcuate pipe section, and wherein said fifth pipe section extends from said fifth swivel joint through a 90° arc and then extends rectilinearly to said filler-neck coupling.

* * * * *